United States Patent [19]

Leir et al.

[11] Patent Number: 4,933,396

[45] Date of Patent: Jun. 12, 1990

[54] METHOD OF MAKING PURELY PRIMARY DIAMINES

[75] Inventors: Charles M. Leir; Jerome J. Hoffman; John E. Stark, all of St. Paul, Minn.

[73] Assignee: Minnesota Mining and Manufacturing Company, St. Paul, Minn.

[21] Appl. No.: 353,452

[22] Filed: May 18, 1989

Related U.S. Application Data

[62] Division of Ser. No. 67,555, Jun. 26, 1987, Pat. No. 4,833,213.

[51] Int. Cl.$^5$ .................... C08G 77/26; C08G 59/00; C08G 59/68; C08G 63/34
[52] U.S. Cl. .................................. 525/410; 525/50; 525/414; 528/38; 528/403; 528/408; 528/417; 528/425
[58] Field of Search ................. 525/410, 414, 50; 528/38, 403, 408, 417, 425

[56] References Cited

U.S. PATENT DOCUMENTS 3,436,359  4/1969  Hubin et al. ................ 525/410

OTHER PUBLICATIONS

Polyurethanes: Chemistry and Technology, Part II, Saunders, J. H. and Frisch, K. C., Interscience, NY 1964, pp. 431–447.

*Primary Examiner*—Harold D. Anderson
*Assistant Examiner*—T. Mosley
*Attorney, Agent, or Firm*—Donald M. Sell; Walter N. Kirn; Darla P. Neaveill

[57] ABSTRACT

The present invention provides a method for making primary amine terminated linear polyethers of molecular weight above about 3500 which have virtually no contamination from in-chain secondary amine functionalities or amine-terminated tertiary amine side-chains. This method involves the production of novel intermediates.

The invention also provides purely linear polyether-polyurea block copolymers formed by chain extension of the primary amine terminated linear polyethers.

11 Claims, No Drawings

METHOD OF MAKING PURELY PRIMARY DIAMINES

This is a division of application Ser. No. 067,555 filed June 26, 1987 now abandoned.

TECHNICAL FIELD

The present invention relates to a method of making polyether diprimary amines that are completely free of secondary or tertiary amine functionality in the polymer chain. The invention also relates to novel precursors for the polyether diprimary amines, and to polyether-polyurea block copolymers made therefrom.

BACKGROUND OF THE INVENTION

Polyethers with molecular weights above 3500 having terminal primary amino functionality are an important class of polymers having a variety of uses. These polyethers may be reacted with epoxy resins to create tough infusible plastics as well as elastomeric vulcanizates. Further, these polyethers may be reacted with diisocyanates to create polyurea block copolymers. It is very important for such applications that the amine terminated polyether precursors be as purely difunctional as possible, i.e., have no terminal hydroxyl, halide, or other inert functionality, in order to maximize the degree of polymerization of the desired products as well as their performance.

U.S. Pat. No. 3,436,359 discloses polyether diamines with a high degree of terminal primary amino groups. These polyethers were obtained by capping the highly difunctional bis-oxonium ions resulting from the reaction of cyclic ether monomers and trifluoromethanesulfonic anhydride with anhydrous ammonia. However, it is difficult to carry out this process without obtaining polyether diamines contaminated with certain amounts of secondary amine groups (up to 3%) as well as smaller amounts of tertiary amino nitrogens (up to 0.3%) in the chain which provide a primary amine terminated polyether branch or side chain. It is especially difficult to control the level of formation of these by-products when the process is carried out on a large scale. Although such mixtures are useful in a number of applications, polyether diamines containing even these low levels of multifunctional impurities are unsuitable for the preparation of high molecular weight soluble polyether-polyurea block copolymers from the reaction of polyether diamines with stoichiometric molar ratios of diisocyanates. These in-chain secondary amines and primary amine terminated tertiary side chains provide additional sites on the polymer chain which result in crosslinking upon reaction with diisocyanates. This typically results in unprocessable gels.

SUMMARY OF THE INVENTION

A method has now been discovered by the present inventors for making primary amine-terminated linear polyethers of the desired molecular weight range which have virtually no contamination from in-chain secondary amine functionalities or amine-terminated tertiary amine side-chains, even when carried out on a large scale. This method involves the production of novel intermediates.

Diamino polyethers made by the process of the invention have the general formula:

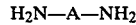   Formula I wherein A is a polyether moiety of molecular weight above about 3500 containing recurring groups, a major portion consisting of oxytetramethylene units, and at most a minor portion consisting of other oxyalkylene units, the alkyl portions thereof having up to about 4 straight chain carbon atoms.

The method of the invention comprises reacting a nitrogen-containing nucleophile according to the formula, NX'X₂, where X is a substituent which is easily cleaved by hydroxylic solvents and X' is selected from the group consisting of X and an electron pair, with a terminally electrophilically-active polyether according to the following general formulae:

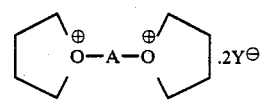   Formula II

   Formula III wherein Y is a non-nucleophilic moiety and A is defined above. Solvolysis is then performed on the product of this reaction, and it is isolated by conventional techniques.

Polymerization of tetrahydrofuran (or tetrahydrofuran plus a minor amount of one or more cationically polymerizable cyclic ethers having from 2 to about 4 ring carbon atoms) with a superacid anhydride (such as trifluoromethanesulfonic anhydride) followed by termination of the resulting di-cationically active linear polyethers by reaction with suitable nitrogen-containing nucleophiles, provides novel intermediates with the following general formulae:

$$X_3N^{\oplus}-A-{}^{\oplus}NX_3.2Y^{\ominus}$$   Formula IV $$X_2N-A-NX_2$$   Formula V wherein X and A are as defined above. Suitable nitrogen-containing nucleophiles are those having no active hydrogens. Solvolysis of the novel intermediates provides the purely primary diamino-terminated polyethers of the invention. Chain-extension of these polyethers then provides the purely linear polyether-polyurea block copolymers of the invention.

DETAILED DESCRIPTION OF THE INVENTION

The present invention provides a method for the preparation of purely primary diamino polyethers of Formula

   Formula I where A is a polyether moiety of molecular weight above about 3500 containing recurring groups, a major portion consisting of oxytetramethylene units, and at most a minor portion consisting of other oxyalkylene units, the alkyl portions thereof having up to about 4 straight chain carbon atoms. Preferably, A consists exclusively of oxytetramethylene units. Preferred diamino polyethers are α,ω-diamino polytetramethylene oxides having the following formula:

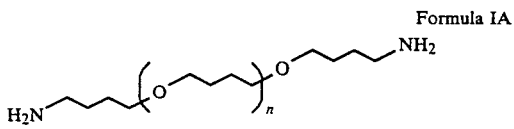

Formula IA wherein n is an integer of at least about 50, preferably from about 140 to about 280.

The method consists of the hydrolysis or, preferably, methanolysis of the novel intermediates represented by Formulas IV and V;

$$X_3N^{\oplus}-A-{}^{\oplus}NX_3 . 2Y^{\ominus} \quad \text{Formula IV}$$

$$X_2N-A-NX_2 \quad \text{Formula V}$$

where X is a substituent which is readily cleaved with hydroxylic solvents such as water or, preferably, methanol to provide the free amine, and A is as defined above.

The novel intermediates of Formulas IV and V are made by reacting terminally electrophilically active polyethers corresponding to Formulas II and III:

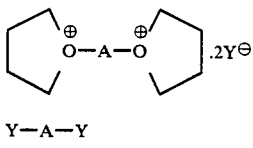

Formula II $$Y-A-Y \quad \text{Formula III}$$

where A is as defined above and wherein Y is a non-nucleophilic moiety such as a trifluoromethanesulfonoxy group, a fluorosulfonoxy group, phosphorus hexafluoride, and the like, with a nitrogen nucleophile that has no active hydrogens. This nucleophile can be represented by Formula VI:

$$NX'X_2 \quad \text{Formula VI}$$

where X is a substituent which is easily cleaved by hydroxylic solvents such as water or, preferably, methanol to provide the free amine; X' may be the same as X or may be a pair of electrons to provide a negative charge. The polyethers of Formulas II and III are prepared by polymerization of tetrahydrofuran (or tetrahydrofuran plus up to about 40 mole percent of one or more cationically polymerizable comonomeric cyclic ethers having from 2 to about 4 ring carbon atoms) with a superacid anhydride such as trifluoromethanesulfonic anhydride. Examples of cationically polymerizable cyclic ether comonomers include 3-methyltetrahydrofuran, 2-methyltetrahydrofuran, ethylene oxide, oxacyclobutane, and the like.

In order to obtain polyether amines by the method of the present invention, the highly difunctional bis-electrophilically active polymer of Formula II or III is reacted with a suitable nitrogen containing nucleophile of Formula VI. This provides the novel intermediates of Formulas IV and V. Suitable nucleophiles are those which have no N-H bonds. Utilizing such nucleophiles entirely eliminates the possibility of forming undesired secondary or tertiary amine in-chain moieties. The nucleophiles should also be reasonably soluble in non-hydroxylic solvents. The X groups, as stated above, should be substituents which are readily cleaved with a solvent, such as water or, preferably, methanol, to provide the primary amine moiety, —NH₂. Finally, the X substituent should be obtained in such a state as to be easily and completely removed from the diamino polyether endproduct.

Preferable nucleophiles include hexamethylenetetramine and alkali metal salts of hexamethyldisilazane. The lithium salt is particularly preferred. Use of these nucleophiles result in the novel intermediates having the Formulas IVA and VA as depicted below:

$$N_3(CH_2)_6\overset{\oplus}{N}-A-\overset{\oplus}{N}(CH_2)_6N_3 . 2Y^{\ominus} \quad \text{Formula IVA}$$

$$(Me_3Si)_2N-A-N(SiMe_3)_2 \quad \text{Formula VA}$$

Cleavage of these intermediates to desired diprimary amines occurs readily upon heating with methanol, or methanol and sulfuric acid. The byproducts of the methanolysis, dimethoxymethane and methoxytrimethylsilane, respectively, are highly volatile and easily distilled from the polymer solution.

The polyether diamines obtained by the method of the invention are highly pure. High molecular weight polyether-polyurea block copolymers may be produced from the reaction of these diamines with various diisocyanates in stoichiometric molar ratios without gellation caused by crosslinking due to the presence of multifunctional impurities. Preferred diisocyanates include toluene diisocyanate, hexamethylene diisocyanate, 4,4'-methylenebis(phenylisocyanate), 4,4,-methylene-bis(cyclohexylisocyanate), and isophorone diisocyanate.

Preferred solvents for the chain extension reaction are those which are unreactive with isocyanates and which maintain both the reactants and the products in solution. Preferred solvents include ethers, chlorinated hydrocarbons, certain alcohols, and mixtures thereof. Most preferred solvents include methylene chloride, tetrahydrofuran and isopropanol.

Polyether-polyurea block copolymers created by chain extension of diprimary amines made by the method of this invention are purely linear, and comprise a repeating unit represented by Formula VII as depicted below:

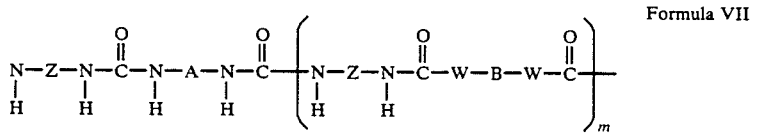

Formula VII wherein:

Z is a divalent radical selected from phenylene, alkylene, aralkylene, and cycloalkylene; preferably Z is methylene dicyclohexylene, hexamethylene and methylene cyclohexylene;

B is a divalent radical selected from alkylene, aralkylene, cycloalkylene, and phenylene;

W is a difunctional moiety selected from

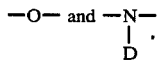

where
- D is hydrogen, an alkyl radical with from one to ten carbon atoms, phenyl, or an alkylene radical which completes a ring structure including B to form a heterocycle;
- m is an integer from zero to about 25, preferably from about 2 to about 10; and
- A is as defined above.

The polymers are made by polymerizing in an inert atmosphere the exceptionally pure polyether diamine of Formula I, optional diamine or diol chain extender having a molecular structure represented by Formula VIII:

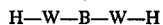

Formula VIII where W and B are as defined above, and a stoichiometric amount of diisocyanate having a molecular structure represented by Formula IX:

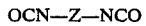

Formula IX where Z is as described above.

The combined molar ratio of polyether diamine and diamine or diol chain extender to diisocyanate in the reaction is that which will provide useful properties in the final product, preferably about 1:0.95 to about 1:1.05.

The resulting polyether polyurea block copolymers are purely linear, high molecular weight, soluble elastomers with outstanding properties. Such elastomers have many applications which are well known in the art. For a detailed discussion, see Polyurethanes: Chemistry and Technology, Part II, Saunders, J. H. and Frisch, K.C., Interscience, NY 1964, pp. 431-447. Depending on the particular application, the elastomeric properties can be varied significantly by the choice of molecular weight of the polyether diamine and, especially, by the incorporation of various low molecular weight chain extenders such as hexamethylene diamine, xylylene diamine, piperazine, and the like, with 1,3-di(4-piperidyl) propane being most preferred.

The following examples are intended to be illustrative only, and should not be construed as limiting the invention.

EXAMPLE 1

A 500 ml three-necked round bottom flask was charged with 125 g dry tetrahydrofuran and 25 g methylene chloride. The solution was cooled to 12° C., and, with mechanical stirring, 3.3 g trifluoromethanesulfonic anhydride in 25 g methylene chloride was added rapidly via syringe. After an exotherm to 21° C., the reaction was cooled to 12° C. and stirred at that temperature for 2.0 hours. The stirrer was stopped, and a slurry of 4.1 g hexamethylene tetramine in 25 g chloroform was added. The stirrer was started and run at high speed for ½ hour at room temperature. A solution of 9.3 g concentrated $H_2SO_4$ in 60 g methanol and 60 g toluene was added, the reaction was equipped with a distilling head, and the volatiles were distilled while replenishing the system with methanol until the pot temperature remained at 65° C. for one hour. A solution of 2.1 g hydroxylamine sulfate in 6 ml water was added and the reaction heated under reflux for an hour. The solution was then cooled to about 30° C., and 29.0 g 50% NaOH was added with stirring. The mixture was heated, and the MeOH and other volatiles were allowed to distill while replenishing the pot with toluene. At a pot temperature of 80° C., 4.1 g solid $NaHCO_3$ was added and the distillation continued until the pot reached 108° C. The mixture was cooled to about 60°-70° C. and filtered through a layer of a filter aid such as diatomaceous earth, available from Johns-Manville under the tradename Super Cel ®, washing the collected salts with toluene. The combined filtrate and washings were stripped to dryness on a rotary evaporator to provide 79.6 g (64%) polytetramethylene oxide diprimary amine as a clear, colorless, viscous oil which solidified on standing at room temperature. Titration of a sample in isopropanol-tetrahydrofuran solution with 0.1 N HCl to a bromphenol blue endpoint gave a molecular weight of 9,734.

EXAMPLE 2

To a 1,000 ml three-necked round bottom flask under dry nitrogen was added 150 g dry tetrahydrofuran and 26.4 g cyclohexane. While stirring mechanically, 3.45 g $(CF_3SO_2)_2O$ was added rapidly via syringe at room temperature. The temperature was allowed to rise to 30° C., and then the stirred reaction was cooled to 15° C. and held at that temperature for a total of 2½ hours. At that time, 25 ml of a 1.0 M solution of lithium bis(trimethylsilyl)amide in hexane was added rapidly via syringe. The temperature rose to 21° C., the mixture was stirred at room temperature for ½ hour, and then diluted to 800 ml with toluene and 100 ml methanol. The reaction flask was fitted for distillation and the volatiles collected to a pot temperature of 110° C. while keeping the volume constant by the continued addition of toluene. The resulting solution, containing a precipitate of lithium trifluoromethanesulfonate, was cooled to 50°-60° C. and filtered through a pad of Super Cel ® filter material which was washed with additional toluene. The combined filtrate and washings were stripped to dryness on a rotary evaporator to give polytetramethylene oxide diprimary amine as a pale yellow viscous oil which solidified to a cream colored solid on standing. The yield was 97.5 g (65%). Titration with 0.1 N HCl gave a molecular weight of 11,000.

EXAMPLE 3

A 75 gallon stainless steel reactor was charged with 90.7 kg dry tetrahydrofuran and cooled to 16° C. with agitation. A solution of 1.5 kg trifluoromethanesulfonic anhydride in 6.8 kg of cyclohexane was added rapidly with stirring. Transfer was completed with an additional 6.8 kg of cyclohexane. The reaction exothermed to 32° C. and was then heated to 43° C. and held at this temperature for ½ hour. The reaction was cooled to 18°-21° C. for an additional 2.5 hours. The viscous, clear solution was treated as rapidly as possible with 13.3 kg of a 20% solution of lithium bis(trimethyl silyl) amide in hexane. The reaction exothermed to 27° C. and was allowed to stir for ½ hour. Toluene (113.4 kg) and methanol (15.5 kg) were charged to the reactor and the heating jacket set to 88° C. Volatiles were allowed to distill over a two hour period. The jacket temperature was then raised to 149° C. and the distillation continued until the contents reached 104° C. The solution was cooled to 32° C.; 45.4 kg of heptane and 6.8 kg of Super Cel ® filter material were added. After stirring for ½ hour, the mixture was filtered and the filtrate returned to the kettle. A total of 83.9 kg of volatiles were distilled. The resulting solution was cooled to room temperature to provide polytetramethylene oxide diprimary amine as a 50% solids solution. The total yield of polymer was 63.5 kg (70% yield) and had a titrated molecular weight of 16,000.

EXAMPLE 4

To a 1,000 ml three-necked round bottom flask under dry nitrogen was added 135 g dry tetrahydrofuran, 13.8 g 3-methyl tetrahydrofuran, and 26.4 g cyclohexane. While stirring mechanically, 3.47 g $(CF_3SO_2)_2O$ was added rapidly via syringe at 10° C. The temperature was allowed to rise to 40° C., and then the reaction was stirred for ½ hour, cooled to 15° C., and held at that temperature for a total of 2 hours. At that time, 25 ml of a 1.0 M solution of lithium bis(trimethylsilyl)amide in hexane was added rapidly via syringe. The temperature rose to 28° C., the mixture was stirred at room temperature for ½ hour, and then diluted with 200 ml of toluene. The reaction flask was fitted for distillation and the volatiles collected to a pot temperature of 110° C. while keeping the volume constant by the continued addition of toluene. The resulting solution, containing a precipitate of lithium trifluoromethanesulfonate, was cooled to 22° C. and 178 g of heptane added before filtering through a pad of Super Cel ® filter material which was washed with additional toluene. The combined filtrate and washings were concentrated to 30% solids w/w. Then, 125 g of methanol was added, and the solution was heated to 105° C. while allowing the methanol and other volatiles to distill. The resultant solution was stripped to dryness on a rotary evaporator to give polyether diprimary amine as a pale yellow viscous oil which solidified to a cream colored solid on standing. The yield was 112.5 g (76%). Titration with 0.1 N HCl gave a molecular weight of 11,853.

EXAMPLE 5

A solution of 8.33 g of 8,333 molecular weight polytetramethylene oxide diprimary amine (1.0 mmol) and 0.288 g 2,5-dimethylpiperazine (1.0 mmol) in 65 g isopropanol and 35 g methylene chloride was stirred and treated with 0.786 g (2.0 mmol) of 4,4'-methylene bis(cyclohexylisocyanate) (H-MDI). In 15 minutes at room temperature, the viscosity had risen dramatically, but the solution remained clear and did not gel. A film was cast to provide, after solvent evaporation, a clear, strong polyether polyurea elastomer film having the following properties:
Tensile—8,155 psi
Elongation—660%
Permanent Set—12%

A film is completely soluble in solvents such as chloroform, toluene, isopropanol, and tetrahydrofuran.

EXAMPLE 6

To a solution of 10.08 g of the polyether diprimary amine of Example 4 (11,853 molecular weight; 0.85 mmol) in 30 ml of methylene chloride at room temperature was added all at once with rapid stirring a solution of 0.76 g of isophorone diisocyanate (3.42 mmol). The resulting solution was treated dropwise with stirring with a solution of 0.54 g 1,3-bis(4-piperidyl) propane (2.57 mmol) in 30 ml of methylene chloride. Toward the end of the addition, the reaction became quite viscous but remained clear. The contents of the flask were cast onto a glass plate and the solvent allowed to evaporate. The resulting polyetherpolyurea block copolymer was obtained as a clear, strong elastomeric film having the following properties:
Tensile—5600 psi
Elongation—700%
Permanent Set—35%

What is claimed is:

1. An intermediate for a purely primary α,ω-diamino polyether having the following general formulae:

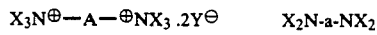

wherein X is a substituent which is easily cleaved by hydroxylic solvents, and A is a polyether moiety of molecular weight above about 3500 containing recurring groups, a major portion of which being oxytetramethylene units, and a minor portion being other oxyalkylene units having up to about 4 straight chain carbon atoms.

2. The intermediate of claims 1 wherein said other oxyalkylene units are derived from cyclic ethers selected from the group consisting of 3-methyl tetrahydrofuran, 2-methyl tetrahydrofuran, ethylene oxide, and oxacyclobutane.

3. The intermediate of claims 1 wherein A is polytetramethylene oxide.

4. The intermediate of claim 1 wherein A having the general formulae:

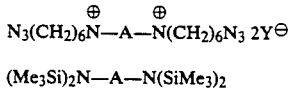

5. A purely primary α,ω-diamino polyether produced by the method of preparation comprising the steps of:
    (a) reacting a nitrogen-containing nucleophile according to the following formula:

where X is a substitutent which is easily cleaved by hydroxylic solvents and X', is selected from the group consisting of X and an electron pair, with a terminally electrophilically active polyether represented by the following general formulae:

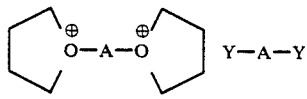

wherein Y is a non-nucleophilic moiety, and A is a polyether moiety having a molecular weight of at least about 3500 containing recurring groups, a major portion of which bneibg oxytetramethylene units, and a minor portion beinbg other oxyalkylene units having up to about 4 straight chain carbon atoms;
    (b) performing solvolysis on the product of the reaction described in (a); and
    (c) isolating the products thereof.

6. A purely primary α,ω-diamino polyether produced by the process of claim 5 wherein said other oxyalkylene units are derived from cyclic ethers selected from the group consisting of 3-methyl-tetrahydrofuran, 2-methyltetrahydrofuran, ethylene oxide, and oxacyclobutane.

7. A purely primary α,ω-diamino polyether produced by the process of claim 5 wherein A is polytetramethylene oxide.

8. A purely linear polyether-polyurea block copolymer comprising a repeating unit having the general formula:

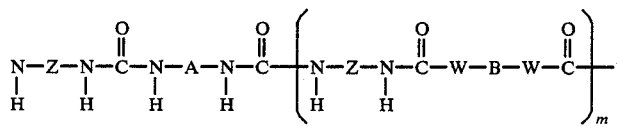

wherein:
Z is a divalent radical selected from the group consisting of phenylene, alkylene, aralkylene, and cycloalkylene;
B is selected from the group consisting of a divalent radical selected from alkylene, aralkylene, cycloalkylene, and phenylene;
W is a difunctional moiety selected from

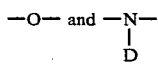

where
D is selected from the group consisting of hydrogen, an alkyl radical with from one to ten carbon atoms, phenyl, and an alkylene radical which completes a ring structure including B to form a heterocycle;
m is an integer from zero to about 25; and
A is a polyester moiety having a molecular weight of at least about 3500 containing recurring groups, a major portion being oxytetramethylene units, and a minor portion being other oxyalkylene units having up to about 4 straight chain carbon atoms.

9. The block copolymers of claim 8 wherein z is selected from the group consisting of methylene dicyclohexylene, hexamethylene, and methylene cyclohexylene.

10. The block copolymer of claim 8 wherein m is an integer from about 2 to about 10.

11. A polyether-polyurea block copolymer according to claim 8, created by chain extension of diprimary amines having the formula $H_2N-A-NH_2$, wherein A is a polyether moiety having a molecular weight of at least about 3500 containing recurring groups, a major portion being oxytetramethylene units, and a minor portion being other oxyalkylene units having up to about 4 straight chain carbon atoms, created by a process comprising the steps of:

(a) reacting a nitrogen-containing nucleophile according to the formula formula $NX'X_2$ wherein X is a substituent which is easily cleaved by hydroxylic solvents and X, is selected from the group consisting of X and an electron pair, with a terminally electrophilically active polyether represented by the following general formulae

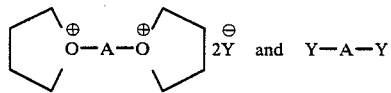

wherein Y is a non-nucleophillic moiety, and A is as defined above, (b) heating the product of reaction (a) with a solvent, and (c) isolating the products thereof.

* * * * *

UNITED STATES PATENT AND TRADEMARK OFFICE
CERTIFICATE OF CORRECTION

PATENT NO. : 4,933,396

DATED : JUNE 12, 1990

INVENTOR(S) : CHARLES M. LEIR ET AL.

It is certified that error appears in the above-identified patent and that said Letters Patent is hereby corrected as shown below:

Col. 2, line 55, "Formula" should be --Formula I:--.

Col. 2, line 21, In the formula, ".$2Y^{\ominus}$" should be -- $\cdot 2Y^{\ominus}$ --.

Col. 2, line 40, In the formula, ".$2Y^{\ominus}$" should be -- $\cdot 2Y^{\ominus}$ --.

Col. 3, line 14, In the formula, ".$2Y^{\ominus}$" should be -- $\cdot 2Y^{\ominus}$ --.

Col. 3, line 28, In the formula, ".$2Y^{\ominus}$" should be -- $\cdot 2Y^{\ominus}$ --.

Col. 4, line 19, In the formula, ".$2Y^{\ominus}$" should be -- $\cdot 2Y^{\ominus}$ --.

Col. 8, line 15, In the formula, ".$2Y^{\ominus}$" should be -- $\cdot 2Y^{\ominus}$ --.

Col. 8, line 23, "claims" should be --claim--.

Col. 8, line 28, "claims" should be --claim--.

Col. 8, line 35, In the formula, " $2Y^{\ominus}$ " should be -- $\cdot 2Y^{\ominus}$ --.

Col. 8, line 46, Delete the comma after "X'".

Col. 8, line 60, "bneibg" should be --being--.

Col. 8, line 61, "beinbg" should be --being--.

Col. 10, line 23, "formula formula" should be
                --following formula--.

Col. 10, line 35, In the formula, " $2Y^{\ominus}$ " should be -- $\cdot 2Y^{\ominus}$ --.

UNITED STATES PATENT AND TRADEMARK OFFICE
CERTIFICATE OF CORRECTION

PATENT NO. : 4,933,396

DATED : JUNE 12, 1990

INVENTOR(S) : CHARLES M. LEIR ET AL.

It is certified that error appears in the above-identified patent and that said Letters Patent is hereby corrected as shown below:

Col. 10, line 35, In the formula, " $2Y^{\ominus}$ " should be -- $\cdot 2Y^{\ominus}$ --.

Signed and Sealed this

First Day of October, 1991

Attest:

*Attesting Officer*

HARRY F. MANBECK, JR.

*Commissioner of Patents and Trademarks*